June 11, 1968 — V. W. CHERRE — 3,387,554
PRESSURIZER UNIT FOR COFFEE PERCOLATOR
Original Filed Oct. 3, 1966
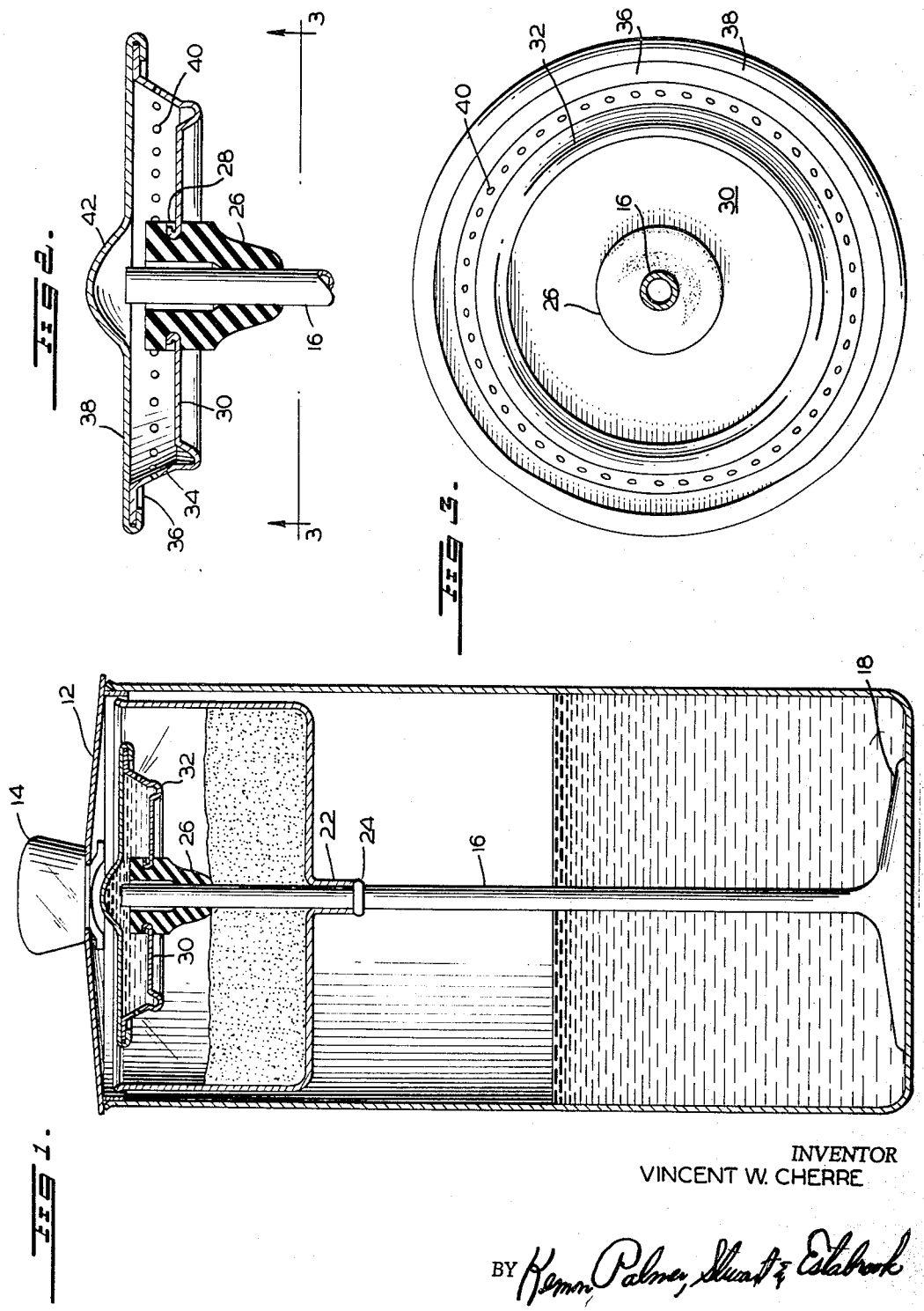
INVENTOR
VINCENT W. CHERRE
BY Kenway, Palmer, Stuart & Estabrook
ATTORNEYS

United States Patent Office 3,387,554
Patented June 11, 1968

3,387,554
PRESSURIZER UNIT FOR COFFEE
PERCOLATOR
Vincent W. Cherre, 22 Hitree Lane,
Rochester, N.Y. 14624
Continuation of application Ser. No. 583,704, Oct. 3,
1966. This application Dec. 4, 1967, Ser. No. 687,920
7 Claims. (Cl. 99—312)

ABSTRACT OF THE DISCLOSURE

A coffee percolator having a hollow tubular member with a coffee ground basket thereon a pressurizer chamber unit mounted on the end of said tubular member superjacent said basket. The pressurizer chamber unit is formed with a plurality of apertures for discharging and directing fluid over the coffee grounds in the basket and sealing means are interposed between said tubular member and the chamber unit. This abstract is neither intended to define the invention of the application which, of course, is measured by the claims, nor is it intended to be limiting as to the scope of the invention in any way.

This application is a continuation of my application Ser. No. 583,704, filed Oct. 3, 1966, now abandoned.

In coffee percolators of the type that are generally in use at the present time, a hollow tube or stem member with a basket member thereon are placed within a pot or container with the lower end of the stem being supported upon a post or projection formed in the bottom of the container or pot. The upper end portion of the tube or stem that extends through a suitable opening in the bottom of the basket is adapted to receive a perforated metal disc which tends to close the upper end of the basket and aid in the retention of the coffee therein. The pot or container is provided with a conventional cover or closure member that has a depending flange that fits between the upper edge portion of the basket and the wall of the container and said cover or closure member usually has a glass dome mounted in the central portion thereof in alignment and registry with the end of the stem projecting through the perforated metal disc. The foregoing tends to describe in general terms a percolator of the electric type. A percolator of the type that is placed upon a burner of a gas or electric stove is of the same general type with the possible exception that the bottom of the stem member does not fit into a valve recess or over a post in the bottom of the pot, but said stem bottom is usually of the free-fitting or mounting type having an arched or convex configuration that is simply supported upon the bottom of the pot or container.

It is extremely difficult in percolators of either the electric or stove type to have the water or fluid delivered through the hollow stem member in such a manner as to obtain a proper diffusion of the fluid with the coffee whereby there will be an even saturation of the coffee within the basket member. One of the reasons for an uneven saturation of the coffee grounds is attributable to the fact that the percolating stem member is almost never in a true vertical or level position whereby there would be an even and level diffusion of the water with respect to the ground coffee. In the stove type of percolator, the lower portion of the stem member is not secured or anchored in any way to the bottom of the container so that the stem is susceptible of movement in various and sundry directions and this movement or action is greatly enhanced when the temperature of the water approaches the boiling point and the percolating action within the coffee pot commences. In electric type of percolators, even though the bottom portion of the stem member is mounted in a valve recess or supported upon a projection or post, the basket member that is mounted on and carried by the upper portion of the stem does not have a tight fit within the container. In addition, the stem does not have a true and tight fit with the basket member so that the basket and stem are readily susceptible of movement and this movement is enhanced and multiplied during the percolating action so that the basket and stem have a tendency to lean to one side or the other of the pot or container and thus, do not assume and maintain a level position.

The leaning or tilting of the basket and stem in either a stove type or electric percolator tends to direct the fluid medium towards one side of the pot or container causing the ground coffee in that side or portion of the basket to become saturated while leaving the ground coffee in the other portion of the basket, which can be regarded as the high side, in a relatively dry and unsaturated condition. The fluid that is delivered through the stem member and which strikes the glass dome or knob that is mounted in and carried by the cover for the container or pot tends to fall straight downward upon the top of the perforated metal diffusion disc and inasmuch as this disc is mounted on the top of the stem member within the basket member, it also will be inclined or tilted in the same direction as the basket and stem. Thus, any and all fluids striking the perforated metal disc will tend to follow the inclination of said disc and deliver the fluid to substantially one side of the basket so that the ground coffee therein would readily become saturated whereas the coffee on the other side of the basket would remain relatively dry and unsaturated. In some percolator a flat metal disc or lid is provided in lieu of the dome shape member and the tendency of the fluid when hitting this member is to flow towards the peripheral edge thereof from whence the fluid would then move down into the ground coffee. This pattern tends to leave the middle or central portion of the ground coffee within the basket in a relatively dry and unsaturated condition while the ground coffee in the outer peripheral portion of the basket would tend to become oversaturated with the fluid. Thus, it is to be noted that in prior types of coffee makers there is not an even and level diffusion of the fluid with the ground coffee so that one does not obtain an even saturation of the ground coffee within the basket.

In the type of percolators that are in use at the present time, the fluid is delivered from the hollow stem member onto the perforated metal disc or against the glass dome and then onto the metal disc from where it drips onto the ground coffee within the basket. The fluid in passing through the ground coffee is not under any pressure or force, so that, the fluid in flowing from the top of the ground coffee to the bottom thereof would tend to seep and thus follow a path of least resistance to its flow. This action creates or develops channels through the ground coffee in the basket so that during the percolating action, the seeping fluid would tend to follow said channels resulting in certain areas of the ground coffee within the basket remaining relatively dry while other areas become oversaturated. Such a situation produces ground coffee which is underextracted in the areas that are relatively dry while the oversaturated areas result in overextracted coffee so that the final brew of coffee can be rather bitter and sour to the taste. The more desirable or ideal cup of coffee is one having an even and proper proportion of extraction of soluble solids from the ground coffee. The fluid pressurizer of the present invention is designed to produce a brew that has a substantially uniform and consistent flavor at all times and in many instances, using less coffee than is customarily employed in prior devices.

One of the objects of the present invention is to provide a coffee percolator having a pressurizer for distributing a fluid over the ground coffee in an even and uniform manner.

Another object is to provide a coffee percolator having a ground coffee container in association with a reservoir chamber that is formed with a plurality of circumferentially spaced apertures around its peripheral edge for initially delivering a fluid to the ground coffee in a relatively slow dripping manner prior to the fluid being forced under pressure from said chamber and through said apertures in a spray action over and through the ground coffee.

Another object is to provide a coffee percolator having a reservoir chamber formed with an inclined peripheral edge having spaced apertures therein for delivering therethrough a fluid medium under pressure.

A further object is to provide a coffee percolator having a reservoir domed-shaped chamber with a resilient plug for mounting said chamber in sealing relation with the stem member of the percolator.

Still other objects are to provide a domed-shaped chamber member that is readily adaptable for use with any type of coffee percolator and which is economical of manufacture.

Other objects and advantages more or less ancillary to the foregoing in the manner in which all of the various objects are realized will appear in the following description, which, when considered in connection with the accompanying drawing, sets forth the preferred embodiment of the invention.

Referring to the drawing wherein the preferred embodiment of the invention is illustrated:

FIGURE 1 is a vertical sectional view of a percolator type coffee maker embodying the present invention;

FIGURE 2 is a vertical sectional view of the domed-shaped chamber or pressurizer of the present invention, and FIGURE 3 is a bottom plan view of the domed-shaped chamber, the view being taken on the line 3—3 of FIGURE 2.

Referring to the drawing, there is shown in FIGURE 1 a conventional percolator of the type that is designed to be heated by a burner of a stove and which includes a container or pot 10 that is formed with a conventional handle and pouring spout, not shown. The container is provided with a cover or lid 12 which has the customary glass knob 14 secured thereto, while a conventional tube or hollow stem member 16 has an enlarged base portion 18 which is freely supported on the bottom of the container 10. The upper portion of the stem member 16 has slidably mounted thereon a coffee ground retaining basket 20 that has depending from the bottom thereof a circular neck portion 22 which abuts an annular ledge or protuberance 24 on the stem 16 for positioning the basket 20 upon said stem.

The upper end of the percolator tube or stem 16 has a plug member 26 mounted thereon which may be formed from any suitable resilient material such as rubber or plastic and due to its resiliency, the plug will have a tight friction fit with the stem member of any conventional percolator. As shown in FIGURE 2, the upper end portion of the plug member 26 is provided with a peripheral recess or slot 28 which receives the inner edge of an annular plate-like member 30. The plate member 30 is formed with an annular depressed portion or recess 32 which merges into an upwardly inclined annular wall member 34 that terminates in a horizontally extending flange portion 36. The flange portion 36 has mounted thereon an upper annular plate member 38 which has its peripheral edge bent over and then backwardly under the flange portion 36 to securely anchor the upper plate member to said flange portion. The plate-like members 30 and 38 are secured to one another in spaced parallel relation and define with the wall member 34 a chamber that is adapted to receive fluid from the upper end of the hollow stem member 16 when the resilient plug member 26 is mounted upon the upper end of the said stem member. The annular wall member 34 of the chamber unit is inclined at an angle of approximately 45° with respect to the bottom plate member 30 and said wall is formed with a plurality of circumferentially spaced apertures 40 which permit the delivery of fluid from the chamber unit. The apertures 40 are located in the wall 34 at a point or in an area closer to the upper plate member 38 than to the lower plate member 30. This arrangement provides for a greater reservoir area for retaining fluid when taking into consideration the annular recess 32 with respect to said apertures. The central portion of the upper plate member 38 is formed with an upwardly extending protuberance that constitutes a dome 42, which overlies the open upper end of the stem member 16. The upper and lower plate members 30 and 38 are carried by the plug member 26 and said elements tend to constitute a unitary structure that may be readily mounted upon or removed from the upper end of the stem members 16 of any conventional percolator. The plate members and plug member when mounted upon the upper end of the stem member 16 constitutes a chamber unit which receives a fluid medium from said stem member and effects the discharge of said fluid medium through the apertures 40 provided in the inclined side wall members 34 in one of several ways depending upon the temperature and pressure of the fluid medium as it is received in said chamber unit from the stem member 16. The friction fit of the plug 26 upon the stem 16 prevents the leakage of any fluid from the unit and also permits said unit to function as a pressurized chamber upon the delivery of the fluid thereto by said stem.

In the use of the percolator pressurizer constituting the present invention, the percolator pot or container 10 is filled with water to a desired depth, after which the hollow stem member 16 is inserted into the pot with the base portion 18 being supported on the bottom thereof. The basket 20 is then slidably mounted on the upper end portion of the stem member 16 and ground coffee is placed therein in an amount sufficient to prepare a desired number of cups of coffee depending upon the amount of water that was initially placed within the pot or container 10. The pressurizer chamber unit is then mounted upon the upper end of the stem member 16 by forcing the resilient plug 26 over the end of said stem member until the end of the stem member is either flush with the upper end of the plug member 26 or projects just slightly thereabove. The cover 12 is then placed upon the container and if the container is an electric percolator, it is connected to a suitable electrical outlet or if it is of the stove type, it is placed upon a burner of a stove so that the water within the container may be heated in the conventional and customary manner for forcing same up through the stem member 16.

As the temperature of the water in the container 10 is gradually raised, the water is forced up through the stem 16 and into the chamber unit where it accumulates until there is a sufficient amount for the water to reach the apertures 40 in the side wall 34 and then flow therethrough. The water will initially flow very slowly through the apertures 40 so as to drip in a circular pattern upon the ground coffee in the basket 20. The water in flowing through the apertures 40 will not only drip directly from the apertures upon the ground coffee in the backet 20, but will also tend to flow down the inclined wall 34 and strike the protuberance formed by the recess 32 in the bottom plate member 30, which functions as a lip in directing and guiding the fluid in droplet form onto the ground coffee in the basket 20. Thus, the initial stage of wetting the ground coffee in the basket 20 will not be restricted to a single annular pattern as defined solely by the drops of water emerging from the apertures 40, but there will be several annular patterns due to the water flowing off of the projection or lip as defined by the annular recess 32. In this manner, the ground coffee in the central portion of the basket 20 will be subjected to a wetting action in an annular or circumferential pattern and the wetting operation will be such that the fluid can flow either towards the center of the basket 20 or towards the outer edge thereof.

As the temperature of the water in the container 10 increases, there is a corresponding increase in the pressure that is applied to forcing the water up the hollow stem 16 and into the chamber unit. As the water is being received in the chamber unit, the pressure therein will tend to build up until the pressure is such that the water in the chamber unit is then forced or ejected through the apertures 40. Thus, the water is forced under pressure through all of the apertures 40 and is sprayed over the ground coffee in the basket 20. This pressurized spraying action forces the water into and through the ground coffee and due to the inclination of the side wall member 34, there is imparted to the water an angular distribution which insures that the water will cover or strike substantially all of the ground coffee in the basket 20. The force with which the water is delivered through the apertures will tend to insure its being forced through the ground coffee in the basket, which action should insure a substantial even saturation of the ground coffee while at the same time eliminating or greatly reducing the channeling of the fluid through the ground coffee. The pressurized spraying of the water through all of the apertures in the inclined side wall 34 will be substantially uniform, even though the stem and basket might be tilted or leaning towards one side of the container 10, so that a circumferential spray pattern will develop with respect to the ground coffee in the basket 20. The foregoing will tend to result in an even and uniform saturation of the ground coffee in the basket and thereby eliminate or substantially correct the condition of overextraction with respect to certain portions of the ground coffee and underextraction with respect to certain other portions of the ground coffee which type of operation is quite common in conventional percolator units. The inclination of the annular side wall 34 of the chamber unit permits the fluid to be forced through the apertures 40 in a spray pattern and some of the water that passes through the apertures 40 will tend to flow down the inclined wall surface and over the annular protuberance defined by the recess 32 from whence it will then drip upon the ground coffee in the basket 20.

Thus, the chamber unit of the present invention readily functions as a pressurizer or a pressurized unit to produce a brew that has not only a substantially uniform and consistent flavor at all times, but has a distinct economical advantage in that less coffee is used. Quite often an excess amount of coffee is used in a conventional percolator in an attempt to improve or enhance the flavor of the cofiee that is being brewed. Such an effort does not achieve its objective as the basic cause of unsatisfactory flavor is primarily due to overextraction or underextraction and/ or a combination of the two. The pressurizer of the present invention not only is capable of brewing coffee having a substantially superior flavor but carries out said operation by using less coffee.

The use of the pressurizer of the present invention is particularly advantageous in the brewing of coffee wherein filters are employed in the container 20 which completely enclose or encompass the ground coffee. When filters of this type are employed, the pressurized spray action produced and developed by the chamber unit of the present invention tends to aid and abet the delivery of fluid to and through said filter units and through the ground coffee contained therein in order to insure a brew of coffee that is uniform and consistent in its flavor.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

What is claimed is:

1. In a coffee percolator having a container for holding a fluid with a hollow tube member vertically disposed therein and a coffee ground basket supported on said tube, a pressurizer chamber unit mounted on said tube superjacent said basket with the end of said tube terminating within said unit, said unit comprising a pair of members arranged in spaced parallel relation to one another, a wall member interposed between and connected to said members, said wall member having a plurality of circumferentially spaced apertures therein, one of said members having an opening therein, means carried by said one of said members within said opening and engageable with the end of said tube for sealing said unit with respect to said tube to facilitate the delivery or fluid through said tube to said unit and the spraying of fluid through said apertures and over the coffee grounds in said basket.

2. In a coffee percolator having a container for holding a fluid with a coffee ground basket supported on a hollow tube member that is vertically positioned in said container, a chamber unit mounted on said tube superjacent said basket, said unit comprising upper and lower plate members of circular configuration arranged in spaced parallel relation to one another, an inclined annular wall interposed between and connected to said plate members and defining therewith a fluid receiving chamber, said wall having a plurality of circumferentially spaced apertures, said lower plate member having an opening therein, a resilient apertured plug positioned within said opening in said lower plate member, said plug mounted on an end of said tube in sealing relation therewith, said chamber initially receiving fluid at a certain temperature from said container through said stem and retaining same therein until the level of the fluid reaches said apertures whereupon the fluid will flow through said apertures and drip onto the ground coffee in the basket in a circular pattern, said chamber subsequently receiving fluid at a higher temperature and retaining said fluid while allowing the pressure to increase in order to force said fluid through said apertures in a uniform circular spray pattern to engage the coffee grounds in said basket to insure an even and uniform flow of fluid through the coffee grounds.

3. Apparatus as set forth in claim 2 wherein said lower plate member is formed with an annular protuberance in its outer surface to define a ledge at the bottom of the inclined side wall for directing an even distribution of fluid from said chamber onto the coffee grounds in said basket.

4. Apparatus as set forth in claim 2 wherein said upper plate member is formed with a domed portion arranged to overlie said hollow stem member and increase the size of said fluid chamber.

5. A pressurizer spray unit for use with a coffee percolator having a fluid container with a coffee ground basket supported on a hollow tube that is vetrically disposed in said container comprising a resilient apertured plug, an annular plate member carried by said plug, an upwardly inclined wall member on said plate member, an upper annular plate member secured to said wall member in spaced paralled relation to said first plate member, said wall member having a plurality of circumferentially disposed apertures formed therein, said plate members and wall member and plug defining a chamber unit for encircling and mounting on the upper end portion of said tube in fluid tight reltaion therewith.

6. A device of the type as described in claim 5 wherein said upper plate member is formed with a domed portion arranged to overlie said apertured plug.

7. A device of the type as described in claim 5 wherein said upper annular plate member is larger than said annular plate member and said annular plate member is formed with an annular protuberance at its area of merging with said wall member.

References Cited
UNITED STATES PATENTS

| | | | |
|---|---|---|---|
| 783,525 | 2/1905 | James | 99—312 |
| 1,588,769 | 6/1926 | Parker | 99—312 |
| 2,151,966 | 3/1939 | Harper | 99—314 |
| 2,866,401 | 12/1958 | Sidell | 99—312 |
| 2,876,693 | 3/1959 | Menter | 99—312 |

ROBERT W. JENKINS, *Primary Examiner.*